(12) United States Patent
Lin et al.

(10) Patent No.: US 7,790,050 B2
(45) Date of Patent: Sep. 7, 2010

(54) PROCESSING METHOD OF POLYMER PRODUCTS

(75) Inventors: Chih-Hsiang Lin, Hsinchu (TW); Hsin-Ching Kao, Hsinchu (TW); Chi-Lang Wu, Tonshou Township, Miaoli County (TW)

(73) Assignee: Industrial Technology Research Institute, Hsinchu (TW)

( * ) Notice: Subject to any disclaimer, the term of this patent is extended or adjusted under 35 U.S.C. 154(b) by 176 days.

(21) Appl. No.: 11/646,689

(22) Filed: Dec. 27, 2006

(65) Prior Publication Data

US 2008/0061033 A1    Mar. 13, 2008

(30) Foreign Application Priority Data

Sep. 13, 2006    (TW) ............................... 95133849 A

(51) Int. Cl.
*B44C 1/22* (2006.01)
(52) U.S. Cl. ................ 216/67; 216/58; 216/62
(58) Field of Classification Search .................. None
See application file for complete search history.

(56) References Cited

U.S. PATENT DOCUMENTS

| | | | | |
|---|---|---|---|---|
| 5,124,173 A | | 6/1992 | Uchiyama et al. ............ 427/569 |
| 5,928,527 A | | 7/1999 | Li et al. ........................ 216/67 |
| 5,977,715 A | * | 11/1999 | Li et al. ................... 315/111.51 |
| 6,221,268 B1 | | 4/2001 | Li et al. ........................ 216/67 |
| 6,284,668 B1 | | 9/2001 | Imahashi ..................... 438/716 |
| 6,299,246 B1 | * | 10/2001 | Tomka ........................ 296/205 |
| 6,408,755 B1 | | 6/2002 | Meisters et al. ............. 101/478 |
| 6,730,238 B2 | * | 5/2004 | Li et al. ........................ 216/67 |
| 2002/0172779 A1 | * | 11/2002 | O'Brien ....................... 427/569 |
| 2007/0113867 A1 | * | 5/2007 | Duan et al. ................... 134/1.1 |

FOREIGN PATENT DOCUMENTS

| CN | 1421564 | 6/2003 |
|---|---|---|
| CN | 1530489 | 9/2004 |

OTHER PUBLICATIONS

Quing-Jun Shi et al., "Study on PET Fabric Surface Modification by APGDP", Master degree thesis of Dalian University of Technology, Jun. 15, 2001.
Chinese Examination Report of Taiwan Application No. 095133849, dated Nov. 3, 2009.

* cited by examiner

*Primary Examiner*—Shamim Ahmed
(74) *Attorney, Agent, or Firm*—J.C. Patents

(57) ABSTRACT

A processing method of a polymer product is provided. This method first supplies a gas to an atmospheric pressure plasma machine to generate an ionized gas. Then, bombard the ionized gas to the surface of the polymer product to create a surface reaction. Afterwards, a dying treatment or an electroplating treatment is performed on the polymer product.

9 Claims, 5 Drawing Sheets
(4 of 5 Drawing Sheet(s) Filed in Color)

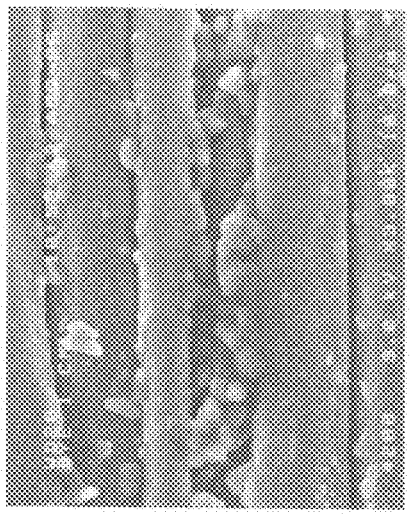
(Experiment 2)
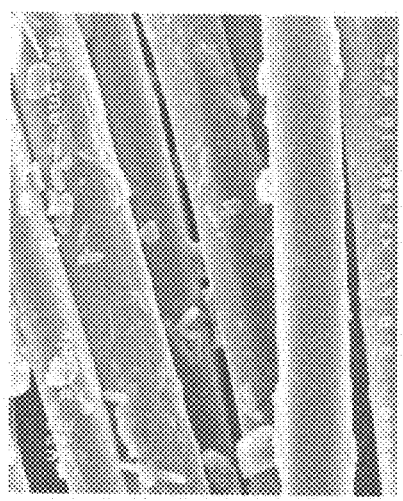
(Experiment 1)
FIG. 4
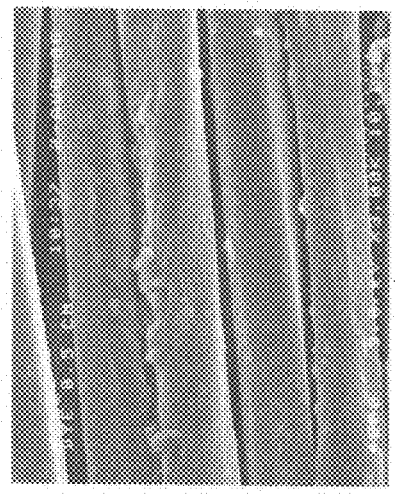
(Comparison Experiment 1)

(Comparison Experiment 2)

(Experiment 3)

(Experiment 6)

(Experiment 5)

(Experiment 4)

(Experiment 9)

(Experiment 8)

(Comparison Experiment 3)

(Experiment 7)

ical protection raises around the globe, promoting environment-friendly products and protecting the natural environment are the basis of human existence and economic development. Internationally, relevant regulations are stipulated one by one to cut down on the use of heavy metals and other prohibited materials.

PROCESSING METHOD OF POLYMER PRODUCTS

CROSS-REFERENCE TO RELATED APPLICATION

This application claims the priority benefit of Taiwan application serial no. 95133849, filed on Sep. 13, 2005. All disclosure of the Taiwan application is incorporated herein by reference.

BACKGROUND OF THE INVENTION

1. Field of the Invention

This invention is related to a processing method, especially to a processing method of polymer products.

2. Description of Related Art

As consciousness of environmental protection raises around the globe, promoting environment-friendly products and protecting the natural environment are the basis of human existence and economic development. Internationally, relevant regulations are stipulated one by one to cut down on the use of heavy metals and other prohibited materials.

In all the industries worldwide, many fabrication processes and technologies utilize materials that are harmful to the environment and the human body.

For example, in conventional electroplating treatment, six-valence chromium ($Cr^{6+}$) as the electroplating solvent, and six-valence chromium itself is a carcinogenic substance and it also pollutes the environment. Especially in the automobile industry, many parts need to be electroplated with a layer of metal for protection. Hence, the European Union officially announces the implementation of "Restriction on the Use of Hazardous Substances (RoHS)" at the beginning of year 2003 to limit use of six dangerous materials, including lead, cadmium (Cd), PBB, PBDE, mercury and six-valence chromium. Therefore, for the electroplating industry, developing new manufacturing processes that comply with the regulations of RoHS is imperative at the moment. Furthermore, in traditional fiber-dyeing industry, there exist similar environmental issues. For the microfiber of new technologies, because the diameter of the microfiber is very small, the fiber remarkably increases more than the surface area, which causes serious problems in the microfiber, such as instant-dyeing, increased dyeing speed and low color retention, etc. In order to solve the problems, overmuch dye is added during the dyeing treatment, which in turn overloads the waste water processing, lowers the adhesiveness, and the dye retention.

Moreover, techniques related to the above are disclosed in some US patents, for example, U.S. Pat. Nos. 6,408,755, 6,284,668, 5,124,173, 5,928,527, and U.S. Pat. No. 6,221,268 etc. The entire contents of the above documents are incorporated herein as references to this present application. However, none of those patents can solve the aforementioned problems.

SUMMARY OF THE INVENTION

In view of this, this invention sets out to provide a processing method of polymer products. This processing method operates in a way that does not harm the human body and the environment, yet increases the surface properties of polymer products.

This invention provides a processing method of polymer products, suitable for fiber dyeing treatment and plastic electroplating treatment. This method first supplies a gas to an atmospheric pressure plasma machine to generate an ionized gas. Then, the ionized gas is bombarded onto the surface of the polymer product to create a surface reaction. Afterwards, a dyeing treatment or an electroplating treatment is performed on the polymer product.

This invention utilizes the atmospheric pressure plasma machine to modify the surface properties of the polymer products, therefore, no harm is done to the human body and the environment. Moreover, the atmospheric pressure plasma machine does not need a vacuum system, and the processing cost can be thus reduced. Additionally, the processing method of this invention does not need to go in and out of a vacuum room, so it can be conducted in continuous processing. On the other hand, this invention can elevate the surface properties of the polymer product, which facilitates the subsequent processing steps.

In order to make the above and other objects, features and advantages of the present invention more comprehensible, preferred embodiments accompanied with figures are described in detail below.

BRIEF DESCRIPTION OF THE DRAWINGS

The file of this patent contains at least one drawing executed in color. Copies of this patent with color drawing(s) will be provided by the Patent and Trademark Office upon request and payment of the necessary fee.

The accompanying drawings are included to provide a further understanding of the invention, and are incorporated in and constitute a part of this specification. The drawings illustrate embodiments of the invention and, together with the description, serve to explain the principles of the invention.

FIG. 4 are the SEM photos of Comparison Experiment 1 and those of Experiments 1 and 2 of this invention.

DESCRIPTION OF EMBODIMENTS

Figure 1:
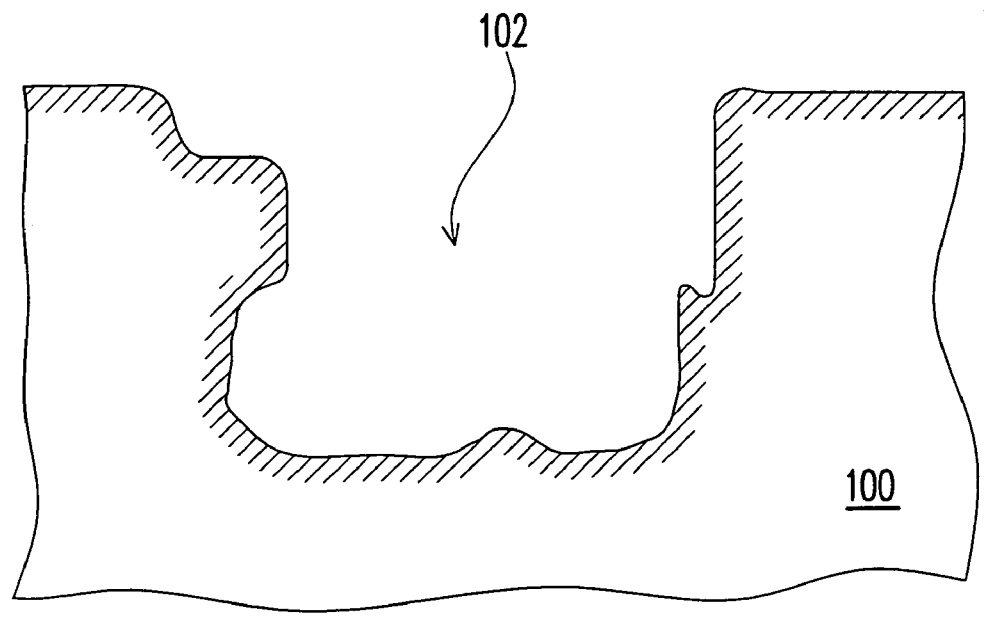
FIG. 1 is a cross-sectional scheme of a polymer product of one embodiment of this invention after the surface modification.

Reference will now be made in detail to the present preferred embodiments of the invention, examples of which are illustrated in the accompanying drawings. Wherever possible, the same reference numbers are used in the drawings and the description to refer to the same or like parts.

This invention mainly utilizes an atmospheric pressure plasma (APP) machine to create a surface reaction on polymer products to modify the surface properties thereof, and substitute conventional surface treatment methods that can cause environmental pollution and do harm to the human body. The polymer products in this invention are, for example, fiber products or plastic products.

This method first supplies a processing gas to the atmospheric pressure plasma machine to create an ionized gas. The flow rate of the processing gas ranges, for example, from 10 milliliters per minute to 300 milliliters per minute. Besides, the operating voltage of the atmospheric pressure plasma machine is set between 100 voltages and 300 voltages, preferably around 265 voltages. The operating current of the atmospheric pressure plasma machine is set between 1 ampere and 8 amperes, preferably around 7.4 amperes.

Then, after the ionized gas is generated, it is bombarded onto the surface of the polymer product to create a surface reaction to modify the properties of the surface and enhance them. In reference to the above-mentioned, the vertical distance between the spray nozzle of the ionized gas and the polymer product is between 0.5 centimeter and 2.0 centimeters, preferably around 1.0 centimeter. The processing angle of the polymer product is between zero degree and thirty degrees.

In reference to the foregoing, the processing gas in this invention can be non-active gases or active gases. This invention can utilize a non-active gas as the processing gas, such as nitrogen, argon or any other suitable non-active gases. The method in this invention is bombarding the ionized gas processed from a non-active gas onto the surface of the polymer product to create an etching reaction on the surface, which then increases the mechanical adhesiveness of the surface of the polymer product. To be more specific, please refer to FIG. 1, after the ionized gas generated from a non-active gas is bombarded onto the surface of the polymer product 100, this ionized gas will corrode the surface of the polymer product 100 and form a slit 102 thereon. In reference to the above, this Slit 102 helps to increase the adhesiveness of the surface of the polymer product.

Figure 2:
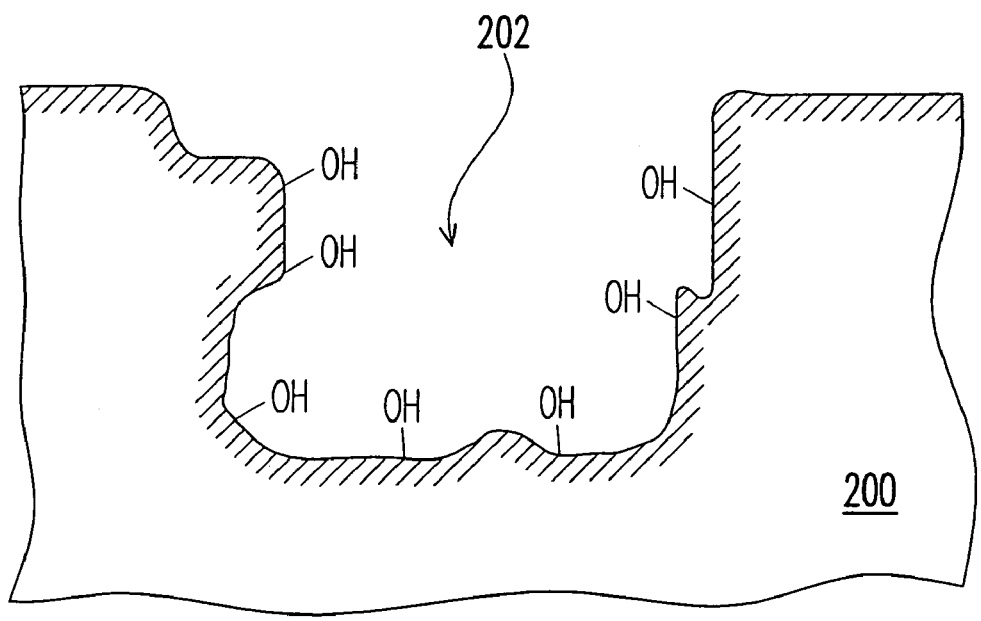
FIG. 2 is a cross-sectional scheme of a polymer product of another embodiment after the surface modification.

Besides, this invention can utilize a non-active gas as the processing gas, such as air, oxygen or any other suitable non-active gases. The method in this invention is bombarding the ionized gas produced from a non-active gas onto the surface of the polymer product to cause etching reaction and activated reaction on the surface. As shown in FIG. 2, the surface etching reaction will create a slit 202 on the surface of a polymer product 200. Additionally, after the ionized gas made from an active gas is bombarded onto the surface of the polymer product 200, polarity groups (such as ox-hydrogen-based,—OH) will be formed when the ionized gas contacts the surface of the polymer product 200 and be connected to the surface of the polymer product 200 (as shown in FIG. 2), which will activate the surface of the polymer product 200 and elevate its hydrophilic property.

After modifying the surface properties of the polymer product, we proceed with subsequent processing of the polymer product. The subsequent processing includes a dyeing treatment or an electroplating treatment.

We illustrate by the example of a fiber product as the polymer product in this invention. Fiber products can be PET fiber, Nylon, PAN fiber or other fiber products, for example. The processing method in this invention first creates a slit on the surface of the fiber product, or even bonds polarity groups on the surface so as to facilitate the spreading of dyes and elevate the adhesiveness of dyeing colors in subsequent dyeing treatment. For the fiber product, the number of times the ionized gas is bombarded onto the surface of the polymer product is preferably three. Especially when the method of this invention is applied to microfiber products, it can solve the inveterate problem of pollution and low adhesiveness of dying colors that dyeing microfiber products usually creates. Moreover, we will further illustrate by the example of a plastic product as the polymer product in this invention. A plastic product can be ABS or other plastic products, for example. The processing method in this invention first creates a slit on the surface of the plastic product, or even bond polarity groups on the surface. Thus it will facilitate diffusion of a metalized film and improve the peel strength of an electroplating material in subsequent electroplating treatments. For the plastic product, the number of times the ionized gas is bombarded onto the surface of the polymer product is preferably six.

Among the above embodiments, we only take fiber products and plastic products as examples; however, the method of this invention is not limited to these. It can also apply to the processing of other polymer products.

It is worth mentioning that the method of this invention utilizes the atmospheric pressure plasma machine to modify the surface properties of the polymer product, so it does not harm the environment and the human body, which conforms to the current trend featuring environmental protection. On the other hand, since the atmospheric pressure plasma machine does not need a vacuum system, it saves more processing cost. Also, the method of this invention does not require going in and out of a vacuum room, so it can proceed in a continuous manufacturing process and saves processing time.

Next, we will enumerate several embodiments to verify the effect of the processing method in this invention. The following embodiment takes a dyeing treatment of a fiber product and an electroplating treatment of a plastic product as examples to demonstrate the efficacy this invention can achieve; however, this invention is not limited to these examples.

Embodiment 1

Figure 3:
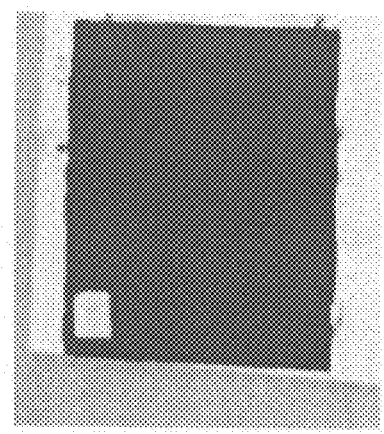
FIG. 3 are the photos of Comparison Experiment 1 together with those of Experiments 1 and 2 of this invention.
Figure 3:
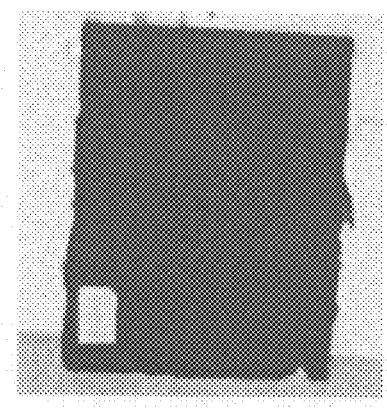
Figure 3:
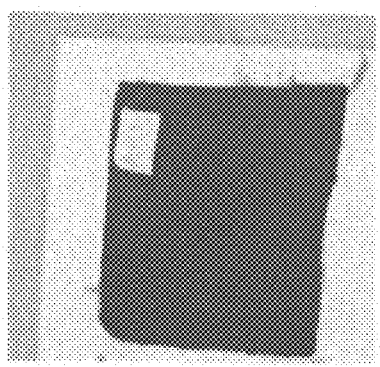

Embodiment 1 includes Comparison Experiment 1 along with Experiments 1 and 2. Among them, Comparison Experiment 1 applies a conventional method (i.e. without using the atmospheric pressure plasma machine) to modify the surface properties of the PET fiber and then dye it. Experiments 1 and 2 utilize the atmospheric pressure plasma machine to process air, and adjust the vertical distance from the spray nozzle of the ionized gas to the polymer product respectively as 0.5 centimeters to 1.0 centimeters, and maintain the number of processing times at three to proceed with the surface modification of the PET microfiber and then with the dying process. The experiments in Comparison Experiment 1 and Experiments 1 and 2 include a dyeing test, eyesight observation, a scanning electron microscope (SEM) analysis and an X-ray photo-electronic spectrum (XPS) analysis. The experiment results are listed in Table 1 and FIGS. 3 and 4.

As known from Table 1, the results of the dyeing test show that the ratios between the color aberration values ($\Delta E$) of Experiments 1 and 2 and that of Comparison Experiment 1 are respectively +1.4 and +2.3. In other words, using the atmospheric pressure plasma machine to modify the surface properties of the PET microfiber and then dye it proves to improve the dyeing effect of the microfiber. Besides, the X-ray photo-electronic spectrum analyses show that the amounts of oxygen atoms on the surface of Experiments 1 and 2 are respectively 34.47% and 31.25%. Both percentages are higher than that of Comparison Experiment 1, 27.78%. Thus, it is inferable that after the surface modification of the PET microfiber by the atmospheric pressure plasma machine, the PET microfiber will have polarity atoms, which increase the hydrophilic property of the PET microfiber surface and in turn improve the dyeing effect. The results of eyesight observation shown in the pictures of FIG. 3 clearly indicate that the dyeing effects of Experiments 1 and 2 are better than that of Comparison Experiment 1. The results of the scanning electron microscope analyses shown in the SEM pictures of FIG. 4 point out that the amount of dye contained in the PET microfiber of Experiments 1 and 2 is more than that of Comparison Experiment 1, i.e. the dyeing effect of Experiments 1 and 2 are better than that of Comparison Experiment 1.

Embodiment 2

Figure 5:
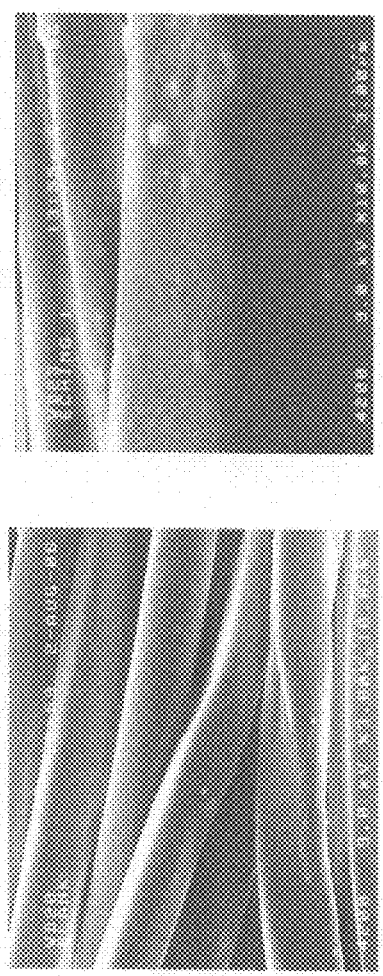
FIG. 5 are the SEM photos of Comparison Experiment 2 and those of Experiments 3, 4, 5 and 6 of this invention.
Figure 5:
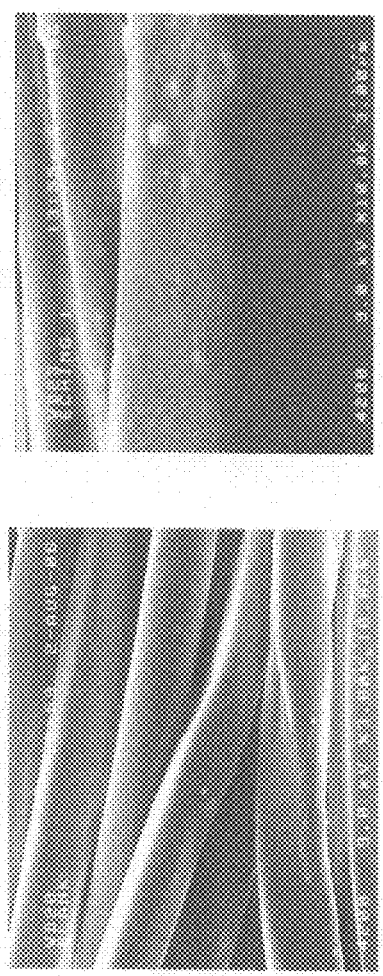
Figure 5:
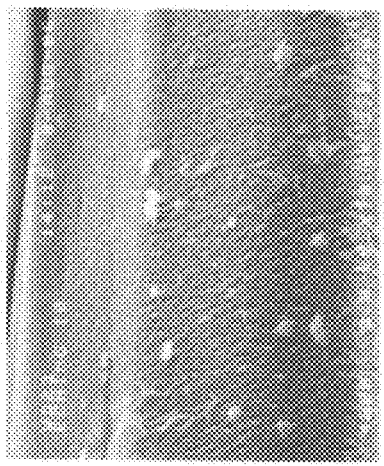
Figure 5:
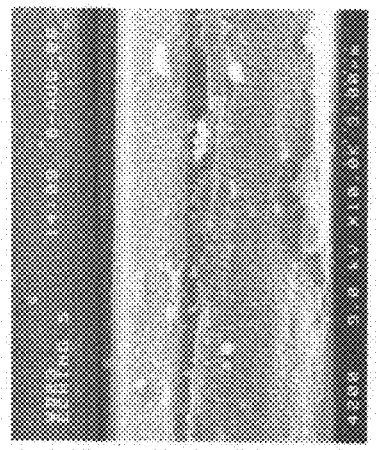
Figure 5:
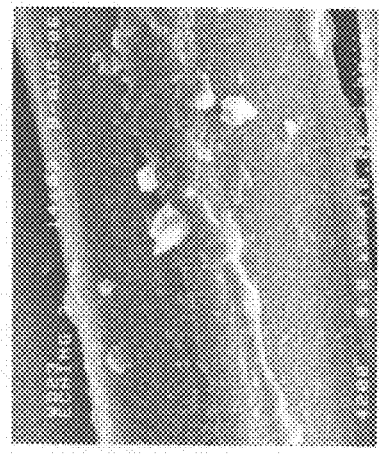

Embodiment 2 includes Comparison Experiment 2 along with Experiments 3, 4, 5 and 6. Among them, Comparison Experiment 2 applies a conventional method (i.e. without using the atmospheric pressure plasma machine) to modify the surface properties of the PET fiber and then dye it. Experiments 3, 4, 5 and 6 utilize the atmospheric pressure plasma machine to process air, and change the processing times as 1, 3, 5, and 10 times; meanwhile, the vertical distance from the spray nozzle of the ionized gas to the polymer product is maintained at 1.0 centimeter to proceed with the surface modification of the PET microfiber and then dye it. The experiments carried out in Comparison Experiment 2 and Experiments 3, 4, 5 and 6 include the scanning electron microscope (SEM) analysis and the X-ray photo-electronic spectrum (XPS) analysis. The experiment results are listed in Table 1 and FIG. 5.

From Table 1 we know that X-ray photo-electronic spectrum analyses show that the amounts of oxygen atoms on the surface in Experiments 3, 4, 5 and 6 are respectively 32.04%, 27.63%, 42.71% and 47.00%. All these percentages are higher than those in Comparison Experiment 2, 23.48%. It can be inferred that Experiments 3, 4, 5 and 6 can effectively improve the dying effect. The results of the scanning electron microscope analyses shown in the SEM pictures of FIG. 5 point out that the amounts of dye contained in the PET microfiber of Experiments 3, 4, 5 and 6 are more than that of Comparison Experiment 2, i.e. the dyeing effects of Experiments 3, 4, 5 and 6 are better than that of Comparison Experiment 2.

Embodiment 3

Embodiment 3 includes Comparison Experiment 7 along with Experiments 7, 8 and 9. Among them, Comparison Experiment 3 utilizes a conventional method (i.e. without the atmospheric pressure plasma machine) to modify the surface properties of the ABS plastic. Experiments 7, 8 and 9 utilize the atmospheric pressure plasma machine to process air as the processed air and set the processing times as 2, 4, and 6 to modify the surface properties of the ABS plastic. The experiments carried out in Comparison Experiment 3 along with Experiments 7, 8 and 9 are the scanning electron microscope (SEM) analyses of the ABS plastic after its surface modification. The experiment results are listed in FIG. 6.

Figure 6:
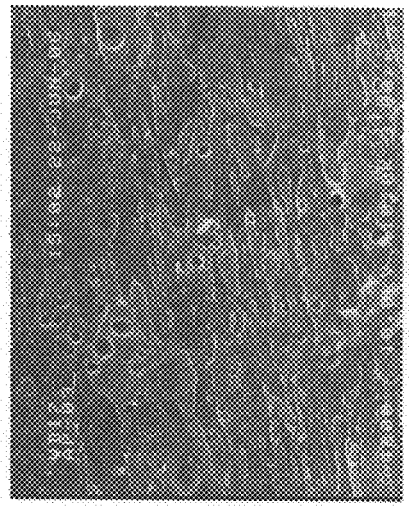
FIG. 6 are the SEM photos of Comparison Experiment 3 and those of Experiments 7, 8 and 9 of this invention.
Figure 6:
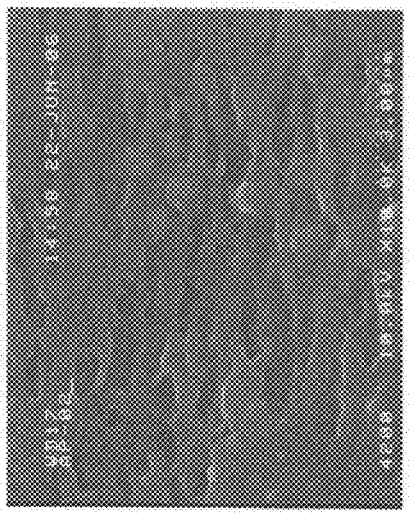
Figure 6:
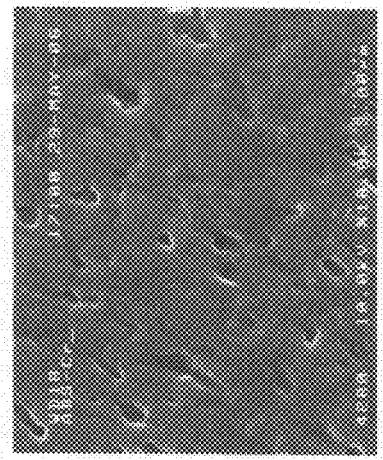
Figure 6:
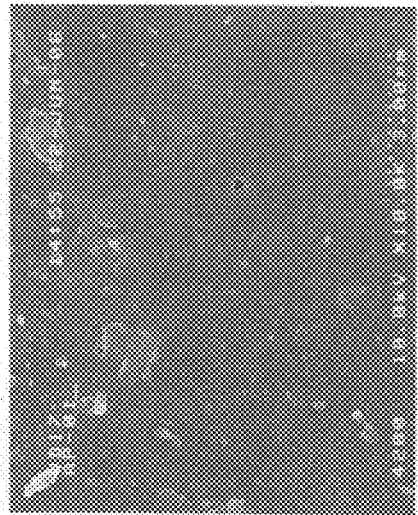

From the SEM pictures in FIG. 6, we know that there are slits on the surface of the ABS plastic in Experiments 7, 8 and 9, and Experiment 9 can achieve an effect close to that of Comparison Experiment 3.

TABLE 1

|  |  | Color Aberration (ΔE) | Amount of Surface Oxygen Atoms (%) |
|---|---|---|---|
| Embodiment 1 | Comparison Experiment 1 | — | 27.78 |
|  | <Experiment 1> | +1.4 | 34.47 |
|  | <Experiment 2> | +2.3 | 31.25 |
| Embodiment 2 | Comparison Experiment 2 |  | 23.48 |
|  | <Experiment 3> |  | 32.04 |
|  | <Experiment 4> |  | 27.63 |

TABLE 1-continued

|  | Color Aberration (ΔE) | Amount of Surface Oxygen Atoms (%) |
|---|---|---|
| <Experiment 5> |  | 42.71 |
| <Experiment 6> |  | 47.00 |

To sum up the above, the processing method in this invention first utilizes an atmospheric pressure plasma machine to modify the surface properties of a polymer product, and then proceeds with the subsequent treatments, therefore, it has the advantages of being environment-friendly and of having a continuous manufacturing process. Besides, the method of this invention can improve the surface properties of the polymer product so as to facilitate the subsequent processing.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A processing method of a polymer product, suitable for fiber dyeing treatment, comprising:
    supplying a processing gas to an atmospheric pressure plasma machine to generate an ionized gas, wherein the processing gas consists essentially of oxygen, nitrogen or a combination of oxygen and nitrogen, bombarding the ionized gas onto the surface of the polymer product to create a surface reaction, wherein the processing angle of the polymer product ranges between zero degree and thirty degrees, and the current of the atmospheric pressure plasma machine is between 1 ampere and 8 amperes; and
    performing a dyeing treatment on the polymer product after bombarding the ionized gas onto the surface of the polymer product, wherein the polymer product comprises polyacrylonitrile (PAN) fiber or acrylonitrile butadiene styrene (ABS).

2. The processing method as claimed in claim 1, wherein the surface reactions comprise a surface etching reaction and a surface activated reaction.

3. The processing method as claimed in claim 1, wherein the surface reaction comprises a surface etching reaction.

4. The processing method as claimed in claim 1, wherein the flow rate of the processing gas ranges between 10 milliliters per minute and 300 milliliters per minute.

5. The processing method as claimed in claim 1, the vertical distance between the spray nozzle of the ionized gas and the polymer product ranges between 0.5 centimeter and 2.0 centimeters.

6. The processing method as claimed in claim 1, the vertical distance between the spray nozzle of the ionized gas and the polymer product is 1.0 centimeter.

7. The processing method as claimed in claim 1, further setting the voltage of the atmospheric pressure plasma machine between 100 voltages and 300 voltages.

8. The processing method as claimed in claim 1, wherein the polymer product is a fiber product.

9. The processing method as claimed in claim 1, wherein the number of times of bombarding the ionized gas onto the surface of the polymer product is three.

* * * * *